F. L. SESSIONS.
MEANS FOR ASSEMBLING AND DISASSEMBLING ELECTRIC MOTORS.
APPLICATION FILED OCT. 29, 1909.
1,043,633.
Patented Nov. 5, 1912.
2 SHEETS—SHEET 1.
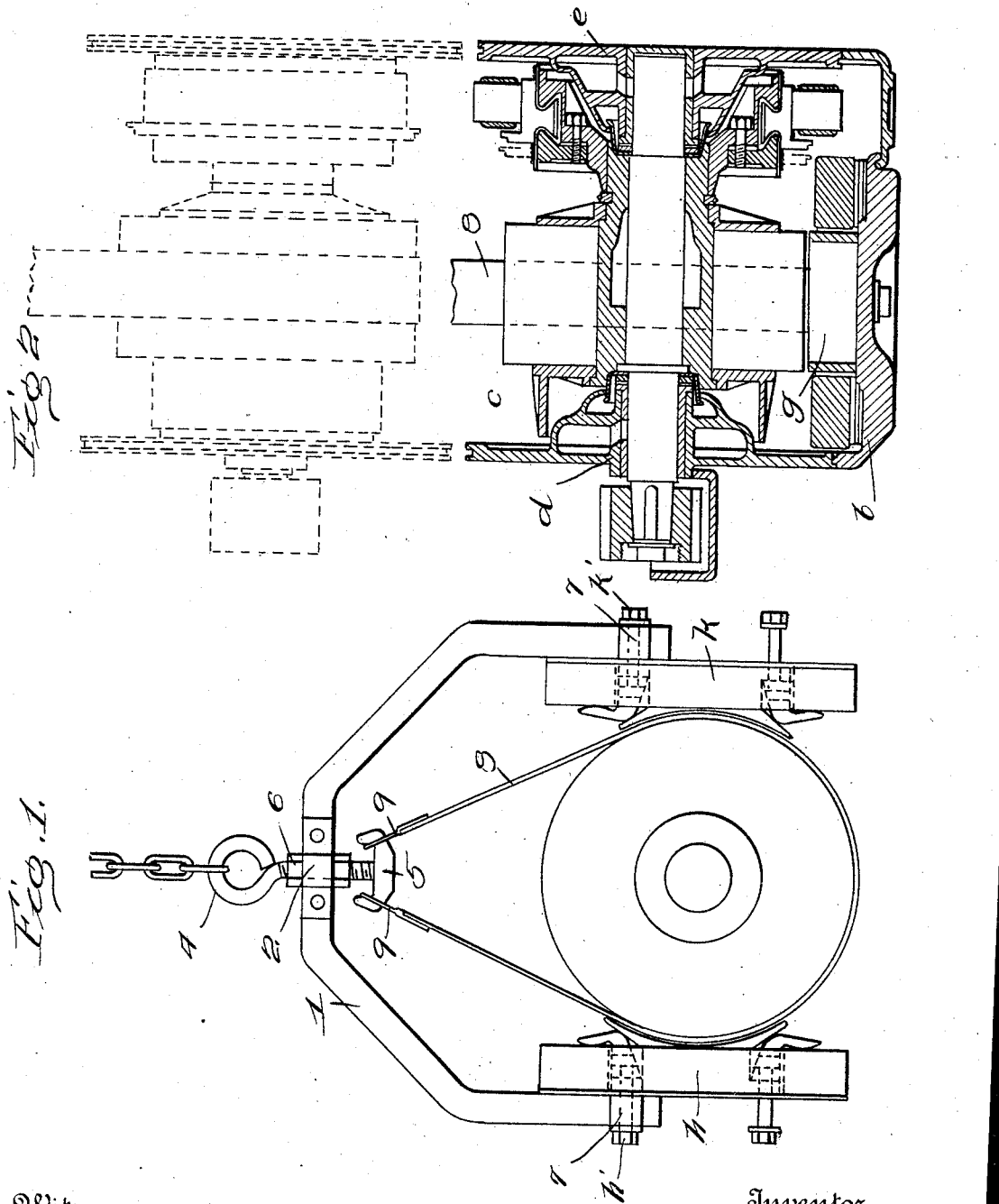

F. L. SESSIONS.
MEANS FOR ASSEMBLING AND DISASSEMBLING ELECTRIC MOTORS.
APPLICATION FILED OCT. 29, 1909.
1,043,633.
Patented Nov. 5, 1912.
2 SHEETS—SHEET 2.
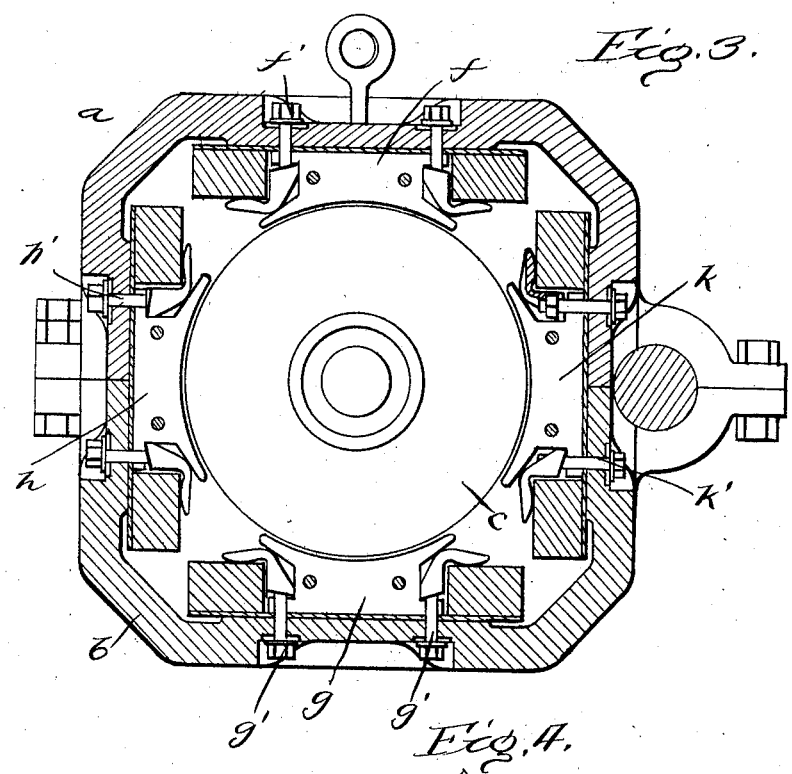
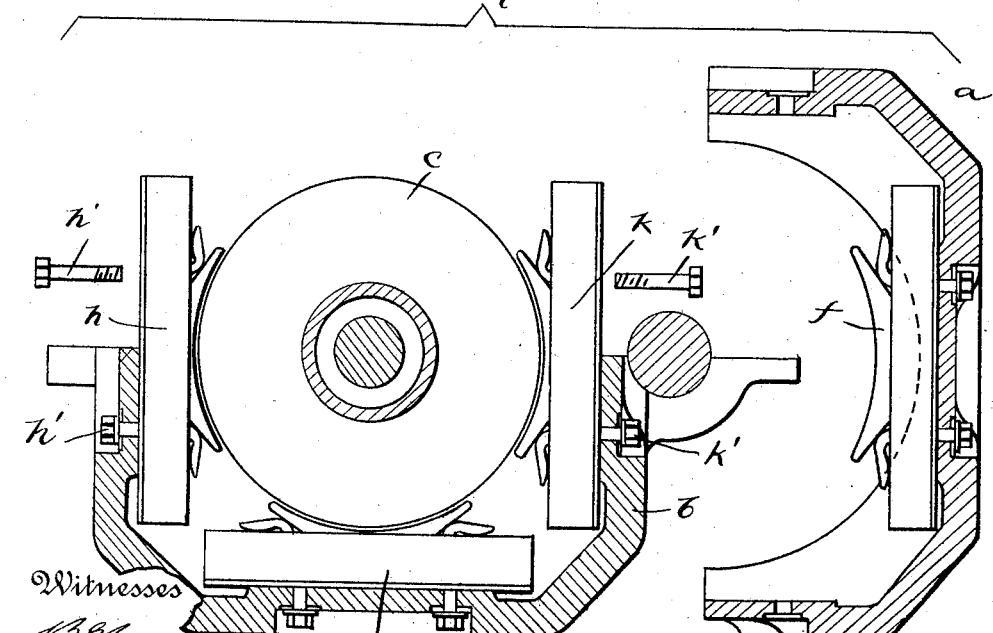

UNITED STATES PATENT OFFICE.

FRANK L. SESSIONS, OF COLUMBUS, OHIO, ASSIGNOR TO THE JEFFREY MANUFACTURING COMPANY, A CORPORATION OF OHIO.

MEANS FOR ASSEMBLING AND DISASSEMBLING ELECTRIC MOTORS.

1,043,633.  Specification of Letters Patent.  Patented Nov. 5, 1912.

Original application filed August 23, 1906, Serial No. 331,781. Divided and this application filed October 29, 1909. Serial No. 525,356.

*To all whom it may concern:*

Be it known that I, FRANK L. SESSIONS, a citizen of the United States, residing at Columbus, in the county of Franklin and State of Ohio, have invented certain new and useful Improvements in Means for Assembling and Disassembling Electric Motors, of which the following is a specification, reference being had therein to the accompanying drawing.

This invention relates to devices for lifting the armature of an electric motor or the like from the field frame, so that the various parts may be readily inspected and repaired.

The object of the invention is to provide devices of this character especially adapted for use in connection with motors of the kind shown in my pending application for electric motors, filed August 23rd, 1906, Serial No. 331,781, of which application this present one is a division.

In the accompanying drawings—Figure 1 shows the lifting appliances with the armature and removable field magnets suspended therefrom. Fig. 2 is a central longitudinal section of the motor, the sling or flexible lifting band being shown in position, and the position of the armature and its bearings when elevated being indicated by dotted lines. Fig. 3 is a transverse section of the motor, and Fig. 4 is a similar view with the upper half of the field frame removed.

In the drawings I have shown the motor with which my improved lifting devices are especially to be used, in order that said devices might be properly understood; but, in the following description, I shall refer only to those features of the motor which will assist in an understanding of the present invention. For a detailed description of the motor reference may be had to my earlier application above referred to.

The motor consists essentially of a field frame divided on an axial plane into two parts $a$ and $b$. Within the field frame is the armature $c$ having its shaft suitably supported in bearings $d$, $e$, the latter being clamped between the sections of the field frame.

The motor is of the 4-pole type, each pole being provided with energizing coils. Two of the poles $f$ and $g$ are mounted as shown diametrically opposite each other upon the upper and lower parts respectively of the field frame, being secured to said frame by means of bolt fastenings $f'$, $g'$. The other pole pieces $h$, $k$ are similar in construction, but, being disposed 90° from the pole pieces $f$ and $g$, they overlie the plane of division of the field frame and they are secured to both parts of the field frame by the bolt fastenings $h'$, $k'$ respectively.

The engaging faces of the poles $h$, $k$, and the frame parts are made plane so that the upper part of the field frame can be removed, as indicated in Fig. 4. When this has been done the pole pieces and the armature are ready to be lifted from the lower part of the field frame, this being possible by reason of the plane vertical faces of the pole pieces which engage with the frame.

Referring now to the lifting appliances proper, 1 is a yoke provided in its middle part with a sleeve 2, through which passes a threaded rod 3. This rod is preferably bent at its upper end to form an eye 4, to which may be secured the lifting chain of a crane or the like. The rod 3 carries at its lower end a head 5 having up-turned ends, as shown. The rod 3 is threaded to receive nuts 6, 6, which secure the rod to the yoke and by means of which the rod may be adjusted up and down relative to the yoke. The yoke is formed at its ends with sleeves or eyes 7, 7, which are adapted to receive the upper fastening bolts $h'$, $k'$, so as to secure the yoke to the pole pieces $h$ and $k$.

8 is a sling or flexible band adapted to be passed around the armature $c$ and having apertured fastening devices 9, 9 at its ends designed to be passed over the hooked ends of the head 5 of rod 3. The devices which lift the three motor parts, namely, the pole pieces $h$, $k$, and the armature $c$ are thus connected so that all three parts can readily be lifted together.

The operation of my improved lifting devices will be readily understood from the foregoing description. The upper part of the motor field frame having been removed, as shown in Fig. 4, the sling 8 is passed around the armature and the yoke 1 is then lowered into position, so that the ends of the sling can be secured to the head 5. The bolts $h'$, $k'$ are then passed through the lower ends of the yoke arms, and made fast to the pole pieces $h$, $k$, thus securing the latter to the yoke. Then by simply lifting the yoke the pole pieces and armature are smoothly and easily lifted from the lower part of the field frame, so as to entirely expose the commutator and other parts. By adjusting the rod 3 in the yoke 1, it is possible to lift the armature and pole pieces exactly simultaneously, so that they are maintained in their proper concentric relation and any injury due to rubbing of the pole faces against the armature is avoided. When the necessary inspection and repairs have been completed, the armature and pole pieces are lowered into position, and after detaching the lifting devices the various motor parts can again be assembled and secured in place, as will be readily understood.

What I claim is—

1. In a lifting device for dismantling and assembling dynamo-electric machines having sectional field frames and field magnets removable with the armature, the combination of a rigid yoke part having depending arms, means for connecting one of said arms rigidly to a field magnet, means for connecting the other arm to a second field magnet, and a part adapted to be connected to the armature, said last named part and rigid yoke part being connected to each other, whereby the armature and field magnets can be simultaneously raised or lowered.

2. In a lifting device for dismantling and assembling dynamo-electric machines having sectional field frames and field magnets removable with the armature, the combination of a rigid yoke part, means for connecting one side of the yoke rigidly to a field magnet, means for connecting the opposite side of the yoke rigidly to a second field magnet, and a part adapted to be connected to the armature of the motor, the last named part and said yoke being connected to each other, whereby the armature and field magnets can be simultaneously raised and lowered.

3. In a lifting device for dismantling and assembling dynamo-electric machines having sectional field frames and field magnets removable with the armature, the combination of a rigid yoke part, means for securing one side of said yoke part rigidly to one of the field magnets, means for securing the other side of the yoke rigidly to a second field magnet, a part adapted to be connected to the armature of the motor, and means for adjustably connecting the last named part to the yoke, whereby the armature and field magnets can be simultaneously raised and lowered without disturbing their relation to each other.

4. In a lifting device for dismantling and assembling dynamo-electric machines having sectional field frames and field magnets removable with the armature, the combination of a rigid yoke part having depending arms, means for connecting one of the arms rigidly to a field magnet, means for connecting the other arm rigidly to a second field magnet, and a flexible sling suspended from the yoke in the plane of the arms thereof, said sling being adapted to pass around and sustain the armature, whereby the armature and field magnets can be simultaneously raised and lowered.

5. In a lifting device for dismantling and assembling dynamo-electric machines having sectional field frames and field magnets removable with the armature, the combination of a rigid yoke part having depending arms, means for connecting one of the arms rigidly to a field magnet, means for connecting the other arm to a second field magnet, a flexible sling adapted to pass around the armature, and means for adjustably connecting the sling to the yoke part, whereby the armature and field magnets can be raised and lowered without disturbing their relations to each other.

6. In a lifting device for dismantling and assembling dynamo-electric machines having sectional field frames and field magnets removable with the armature, the combination of a rigid yoke part, means for connecting one side of said part rigidly to a field magnet, means for connecting the other side of said part to a second field magnet, a part adapted to be connected to the armature, and a connecting device on the rigid yoke part adapted to connect with a suitable hoisting tackle, the rigid yoke part and the armature engaging part being connected to each other, whereby the armature and field magnets can be simultaneously raised and lowered.

In testimony whereof I affix my signature, in presence of two witnesses.

FRANK L. SESSIONS.

Witnesses:
E. P. SNIVELY,
ALEX. M. READ.

---

Copies of this patent may be obtained for five cents each, by addressing the "Commissioner of Patents, Washington, D. C."